United States Patent [19]
Wagner et al.

[11] Patent Number: 4,997,630
[45] Date of Patent: * Mar. 5, 1991

[54] REMOVAL OF $CO_2$ AND/OR $H_2S$ FROM GASES

[75] Inventors: Eckhart Wagner, Maxdorf; Klaus Volkamer, Frankenthal; Werner Hefner, Lampertheim; Ulrich Wagner, Limburgerhof, all of Fed. Rep. of Germany

[73] Assignee: BASF Aktiengesellschaft, Ludwigshafen, Fed. Rep. of Germany

[*] Notice: The portion of the term of this patent subsequent to Aug. 27, 2002 has been disclaimed.

[21] Appl. No.: 328,722

[22] Filed: Mar. 24, 1989

Related U.S. Application Data

[63] Continuation of Ser. No. 937,478, Dec. 3, 1987, abandoned, which is a continuation of Ser. No. 709,424, Mar. 7, 1985, abandoned.

[30] Foreign Application Priority Data

Mar. 10, 1984 [DE] Fed. Rep. of Germany ....... 3408851

[51] Int. Cl.$^5$ ..................... C01B 17/16; C01B 31/20
[52] U.S. Cl. .................................. 423/228; 423/226; 423/229
[58] Field of Search ..................... 423/226, 229, 228

[56] References Cited

U.S. PATENT DOCUMENTS

| | | | |
|---|---|---|---|
| 2,477,314 | 7/1949 | Schamann | 423/229 |
| 3,622,267 | 11/1971 | Bartholome et al. | 423/229 |
| 4,146,569 | 3/1979 | Giammarg36co et al. | 423/229 |
| 4,198,378 | 4/1980 | Giammarco et al. | 423/229 |
| 4,336,233 | 6/1982 | Appl et al. | 423/228 |
| 4,477,420 | 10/1984 | Bauer et al. | 423/236 |
| 4,537,753 | 8/1985 | Wagner et al. | 423/229 |

FOREIGN PATENT DOCUMENTS 2551717 3/1980 Fed. Rep. of Germany.

Primary Examiner—Robert L. Stoll
Assistant Examiner—Lori F. Cuomo
Attorney, Agent, or Firm—Keil & Weinkauf

[57] ABSTRACT

Gases containing $CO_2$ and/or $H_2S$ in a first absorption stage, at from 40° to 100° C., with an aqueous absorption liquid containing from 20 to 79% by weight of methyldiethanolamine, the gas obtained at the top of the first absorption stage is fed to a second absorption stage in which, it is treated at from 30° to 90° C. with an aqueous absorption liquid which contains from 20 to 79% by weight of methyldiethanolamine and has a lower content of $CO_2$ and/or $H_2S$ than the absorption liquid fed into the first absorption stage, the treated gas is taken off at the top of the second absorption stage, the aqueous absorption liquid obtained at the bottom of the second absorption stage and preladen with $CO_2$ and/or $H_2S$ is fed to the top of the first absorption stage, the aqueous absorption liquid obtained in the lower part of the first absorption stage and laden with $CO_2$ and/or $H_2S$ is let down in two or more flash stages in order to regenerate it, the final flash stage being operated under reduced pressure, a stream of absorption liquid obtained at the bottom of the final flash stage is recycled to the first absorption stage, a further stream of absorption liquid obtained at the bottom of the final and/or penultimate flash stages is fed to a stripping zone for further regeneration, and the regenerated absorption liquid obtained at the bottom of the stripping zone is recycled to the second absorption stage.

5 Claims, 2 Drawing Sheets

REMOVAL OF CO₂ AND/OR H₂S FROM GASES

This application is a continuation of application Ser. No. 937,478, now abandoned filed on Dec. 3, 1987, which is a continuation of application Ser. No. 709,424, filed on Mar. 7, 1985, now abandoned.

The present invention relates to a process for the removal of $CO_2$ and/or $H_2S$ from gases by means of an aqueous methyldiethanolamine-containing absorption liquid.

It has been disclosed, for example in German Pat. No. 2,551,717, that $CO_2$ and/or $H_2S$ can be removed from gases by means of aqueous solutions of alkanolamines. Although the conventional method is very cost-efficient, it is not satisfactory in every case.

It is an object of the present invention to provide a process for the removal of $CO_2$ and/or $H_2S$ from gases, which can be operated with lower energy consumption and capital costs.

We have found that this and other objects and advantages are achieved, in accordance with the invention, by a process for the removal of $CO_2$ and/or $H_2S$ from gases containing $CO_2$ and/or $H_2S$ by means of an aqueous alkanolamine-containing absorption liquid, wherein the gas containing $CO_2$ and/or $H_2S$ is treated, in a first absorption stage, at from 40° to 100° C., with an aqueous absorption liquid containing from 20 to 70% by weight of methyldiethanolamine, the gas obtained at the top of the first absorption stage is fed to a second absorption stage in which, to effect further removal of $CO_2$ and/or $H_2S$, it is treated at from 30° to 90° C. with an aqueous absorption liquid which contains from 20 to 70% by weight of methyldiethanolamine and has a lower content of $CO_2$ and/or $H_2S$ than the absorption liquid fed into the first absorption stage, the treated gas is taken off at the top of the second absorption stage, the aqueous absorption liquid obtained at the bottom of the second absorption stage and preladen with $CO_2$ and/or $H_2S$ is fed to the top of the first absorption stage, the aqueous absorption liquid obtained in the lower part of the first absorption stage and laden with $CO_2$ and/or $H_2S$ is let down in two or more flash stages in order to regenerate it, the final flash stage being operated under reduced pressure, a stream of absorption liquid obtained at the bottom of the final flash stage is recycled to the first absorption stage, a further stream of absorption liquid obtained at the bottom of the final and/or penultimate flash stages is fed to a stripping zone for further regeneration, and the regenerated absorption liquid obtained at the bottom of the stripping zone is recycled to the second absorption stage.

In an advantageous embodiment of the process, in order to compensate for water losses due to water present in the gas streams taken off at the top of the second absorption stage and/or from the flash stages and/or from the stripping zone, an amount of steam corresponding to the water loss is fed in at the bottom of the penultimate flash stage.

In another preferred embodiment of the process, the reduced pressure in the final flash stage is produced by means of a steam ejector. It may be advantageous if the gas taken off at the top of the final flash stage is fed, together with the steam used to operate the steam ejector, to the bottom of the penultimate flash stage.

By operating the final flash stage under reduced pressure, a regenerated absorption liquid having a lower $CO_2$ and/or $H_2S$ content is obtained, so that it is possible to circulate smaller amounts of absorption liquid. This results in corresponding savings in energy consumption for transporting the absorption liquid. At the same time, this procedure permits the use of less complicated apparatus, with the result that capital costs can also be reduced. Another advantage of the process is that water losses which arise in the gas washers as a result of water being present in the gas streams taken off at the top of the second absorption column and from the flash chambers and the stripper can be compensated for by feeding in at the bottom of the penultimate flash stage an amount of steam corresponding to the water loss. As a result of this procedure, it is possible not only to regulate the water balance of the gas washer but at the same time to control the heat balance of the said unit, so that a heat exchanger present in the gas washer for regulating the heat balance can be smaller or, if appropriate, completely dispensed with.

Examples of gases treated by the novel process are coal gasification gases, coke oven gases, natural gases and synthesis gases.

The gases have a $CO_2$ content of in general from 1 to 90, preferably from 2 to 90, and particularly from 5 to 60, mol %. In addition to the $CO_2$, the gases can contain $H_2S$ as a further acidic gas, or can contain $H_2S$ alone, for example in amounts of a few mol ppm, eg. from 1 mol ppm to 50 mol %, preferably from 10 mol ppm to 40 mol %.

The solvent used for the process according to the invention is an aqueous absorption liquid containing from 20 to 70, preferably from 30 to 65, and in particular from 40 to 60, % by weight of methyldiethanolamine. Advantageously, an aqueous methyldiethanolamine solution is employed, for example an aqueous solution of technical grade methyldiethanolamine. In an advantageous embodiment of the process, the aqueous methyldiethanolamine solution used additionally contains from 0.05 to 1, in particular from 0.1 to 0.8, and especially from 0.1 to 0.6, mole/l of a primary amine or alkanolamine, such as monoethanolamine, or preferably a secondary amine or alkanolamine, advantageously methylmonoethanolamine, very particularly advantageously piperazine.

The aqueous absorption liquid containing from 20 to 70% by weight of methyldiethanolamine can additionally contain a physical solvent. Examples of suitable physical solvents are N-methylpyrrolidone, tetramethylene sulfone, methanol, oligoethylene glycol dialkyl ethers, such as oligoethylene glycol methyl isopropyl ether (SEPASOLV MPE) or oligoethylene glycol dimethyl ether (SELEXOL). The physical solvent is present in the absorption liquid in general in an amount of from 1 to 60, preferably from 10 to 50, in particular from 20 to 40, % by weight.

The novel process is carried out as follows: the gas containing $CO_2$ and/or $H_2S$ is first treated, in the first absorption stage, with the methyldiethanolamine-containing absorption liquid, the temperature maintained in the first absorption stage being from 40° to 100° C., preferably from 50° to 90° C., in particular from 60° to 90° C. Advantageously, the gas being treated is fed into the lower part of the first absorption stage, preferably into the lower third, countercurrent to the absorption liquid, which is advantageously introduced into the upper part of the first absorption stage, preferably into the upper third. The gas obtained at the top of the first absorption stage is fed to a second absorption zone in which, for further removal of $CO_2$ and/or $H_2S$, it is treated, at from 30° to 90° C., preferably from 40° to 80° C., in particular from 50° to 80° C., with the methyldiethanolamine-containing absorption liquid which has a lower content of $CO_2$ and/or $H_2S$ than that of the absorption liquid fed to the first absorption stage. Regarding the second absorption stage, too, the gas being treated is advantageously fed into the lower part, preferably into the lower third, of the second absorption zone, countercurrent to the absorption liquid, which is advantageously introduced into the upper part, preferably into the upper third, of the second absorption zone. The product gas is taken off at the top of the second absorption zone. The aqueous absorption liquid which is obtained at the bottom of the second absorption stage and is preladen with $CO_2$ and/or $H_2S$ is fed to the top of the first absorption stage. In general, pressures of from 5 to 110, preferably from 10 to 100, in particular from 20 to 90, bar are employed in the first and second absorption stages, and the pressures in these two stages may differ from one another. In general, however, the first and second absorption stages are operated under the same pressure, or essentially the same pressure, the pressure differences occurring as a result of, for example, the pressure loss resulting in the absorption stages. The absorption stages used are advantageously absorption columns, in general packed columns or columns equipped with trays. The absorption liquid laden with the acidic gases $CO_2$ and/or $H_2S$ is taken off in the lower part of the first absorption zone, preferably in the lower third, in particular at the bottom of this absorption zone.

Thereafter, the laden absorption liquid obtained from the first absorption stage is regenerated by being let down in not less than 2, advantageously from 2 to 5, preferably 2 or 3, flash stages, the final flash stage being operated under reduced pressure, and, if necessary, the water losses of the system as a result of water being present in the gas streams taken off at the top of the second absorption stage and from the flash stages and stripping zone are compensated for at the same time by feeding in at the bottom of the penultimate flash stage an amount of steam corresponding to the water loss. Preferably, the pressure in the final flash stage is maintained at from 0.3 to about 1, preferably from 0.5 to about 1, in particular from 0.6 to about 0.9, bar. Suitable apparatuses for producing the reduced pressure in the final flash stage are the apparatuses conventionally used for generating reduced pressure, for example mechanical apparatuses, such as vacuum pumps or compressors, e.g. screw-type compressors or centrifugal compressors, or steam ejectors; it may be advantageous to use mechanical apparatuses for generating reduced pressure.

The temperatures used in the flash stages are in general from 35° to 100° C., preferably from 45° to 90° C., in particular from 55° to 85° C.

To compensate for the water losses which arise in the process as a result of water being present in the gas streams taken off at the top of the second absorption stage and from the flash stages and the stripping zone, an amount of steam corresponding to the water loss is fed in, advantageously at the bottom of the penultimate flash stage. As a rule, the water present in the gas streams taken off is essentially removed as steam. Low pressure, medium pressure or high pressure steam, i.e. steam under from 1.5 to 100 bar, can be fed into the bottom of the penultimate flash stage. Preferably, low pressure steam, e.g. under from 1.5 to 10, advantageously from 1.5 to 5, bar, is used, since this low pressure steam is generally cheaply available.

The gas taken off at the top of the final flash stage can be released into the atmosphere, or can be mixed with the gas stream removed from the penultimate flash stage, and the mixture fed for further treatment. In an advantageous embodiment of the process, the reduced pressure in the final flash stage is produced by means of a steam ejector, and, advantageously, the gas taken off at the top of the final flash stage is fed, together with the steam used to operate the steam ejector, to the bottom of the penultimate flash stage.

If the steam from the steam ejector is fed in at the bottom of the penultimate flash stage, the steam ejector is advantageously operated with the amount of steam required to compensate for the water losses of the process. However, it is also possible for the steam ejector to be operated with less than the amount of steam required to compensate for the water losses, and for the amount of steam still required for this purpose additionally to be fed in at the bottom of the penultimate flash stage. The steam ejector can be operated using medium pressure or high pressure steam, preferably medium pressure steam, e.g. from 5 to 20 bar, preferably from 5 to 10 bar.

The penultimate flash stage is advantageously operated under a pressure of about 1-30, preferably about 1-25, in particular about 1-20, bar.

Flashing is advantageously carried out using flash chambers which can, for example, also be in the form of columns. These flash chambers need not contain special baffles. However, it is also possible to use columns equipped with baffles, e.g. packed columns.

A gas stream which essentially contains the acidic gases $CO_2$ and/or $H_2S$ is obtained at the top of the final flash stage, and is advantageously either combined with the gas taken off at the top of the penultimate flash stage, or is fed, together with the steam for operating the steam ejector, to the bottom of the penultimate flash stage.

A stream of the absorption liquid which is obtained at the bottom of the final flash stage and which, in the flash stages, has been freed from the acidic gases $CO_2$ and/or $H_2S$ to a substantial extent, advantageously to more than 50%, preferably to more than 60%, is then recycled to the first absorption stage as a wash liquid, and is advantageously introduced at the top of this absorption stage. Another stream of absorption liquid which is obtained at the bottom of the final and/or penultimate flash stages is fed, for further regeneration, to a stripping zone in which the acidic gases $CO_2$ and/or $H_2S$ still present in this stream are substantially stripped off. In a preferred embodiment of the procedure described above, the absorption liquid obtained at the bottom of the final flash stage is completely recycled to the first absorption stage, and a bleed stream of the absorption liquid obtained at the bottom of the penultimate flash stage is fed to the stripping zone, for further regeneration. In another preferred embodiment, some of the absorption liquid obtained at the bottom of the final flash stage is recycled to the first absorption stage as a wash liquid, and a further bleed stream of the absorption liquid obtained at the bottom of the final flash stage is fed to the stripping zone, for further regeneration. However, it is also possible for a bleed stream of the absorption liquid obtained at the bottom of the final flash stage to be recycled to the first absorption stage as a wash liquid, and another bleed stream of the absorption liquid obtained at the bottom of the final flash stage, and a bleed stream of the absorption liquid obtained at the bottom of the penultimate flash stage, to be recycled to the stripping zone, for further regeneration. The stream recycled to the first absorption stage and that fed to the stripping zone are in a ratio of, in general, from 10:1 to 1:2, preferably from 5:1 to 1:1. The gas stream obtained at the top of the stripping zone, and essentially containing $CO_2$ and/or $H_2S$ in addition to steam, can be removed from the system. However, it may also be advantageous to recycle this stream into the lower part, preferably into the lower half, in particular into the lower third, of the penultimate flash stage, in order to reduce the water losses of the system. The stripping zone used is advantageously a stripping column, in general a packed column, or a column equipped with trays. In general, the stripping column is operated at from 85° to 115° C., preferably from 85° to 110° C., in particular from 90° to 110° C.

The regenerated absorption liquid obtained at the bottom of the stripping zone is recycled to the second absorption stage, where it is advantageously introduced at the top.

Figure 1:
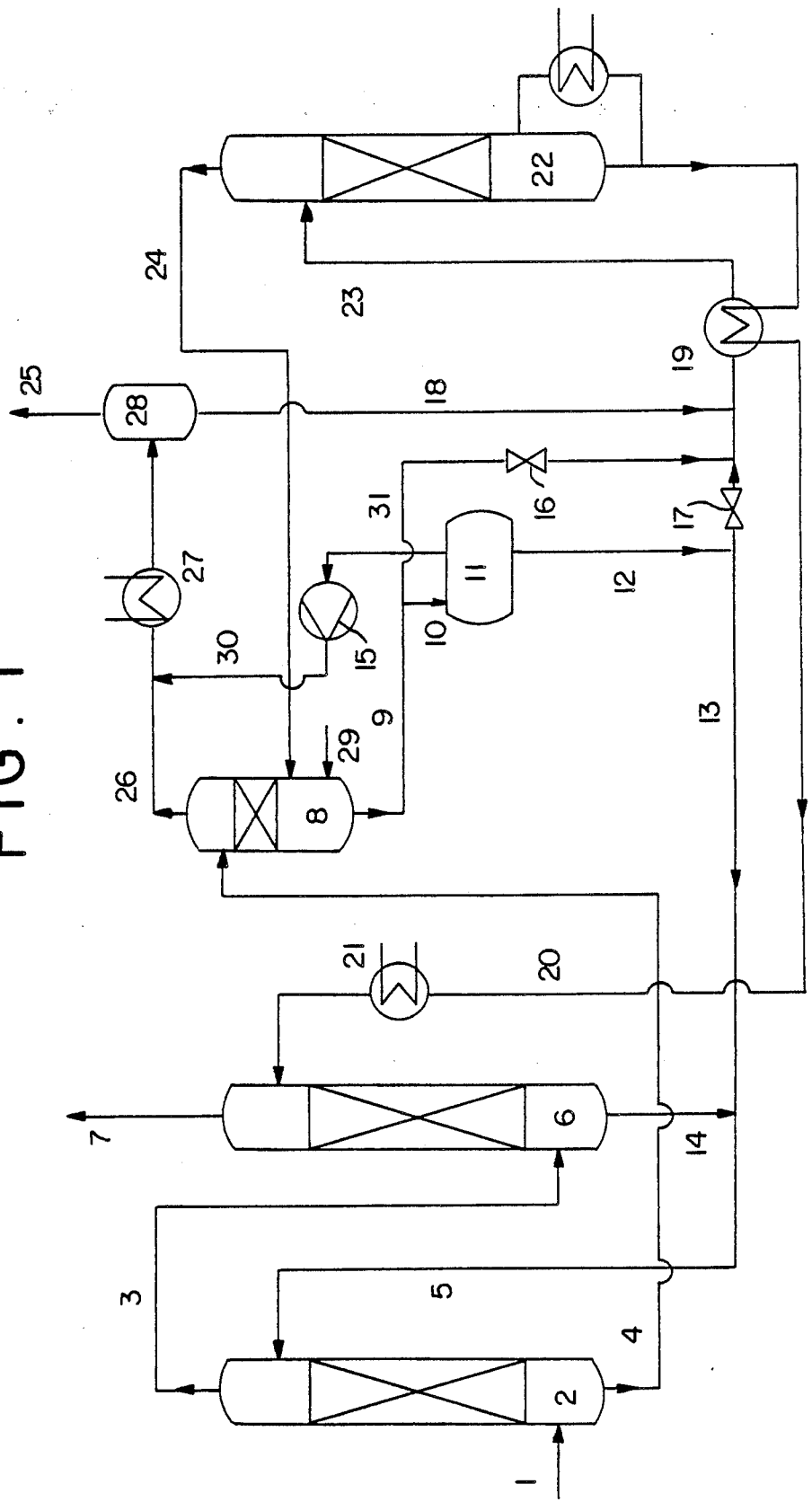
FIG. 1 schematically shows the process of the invention using a vacuum pump.
Figure 2:
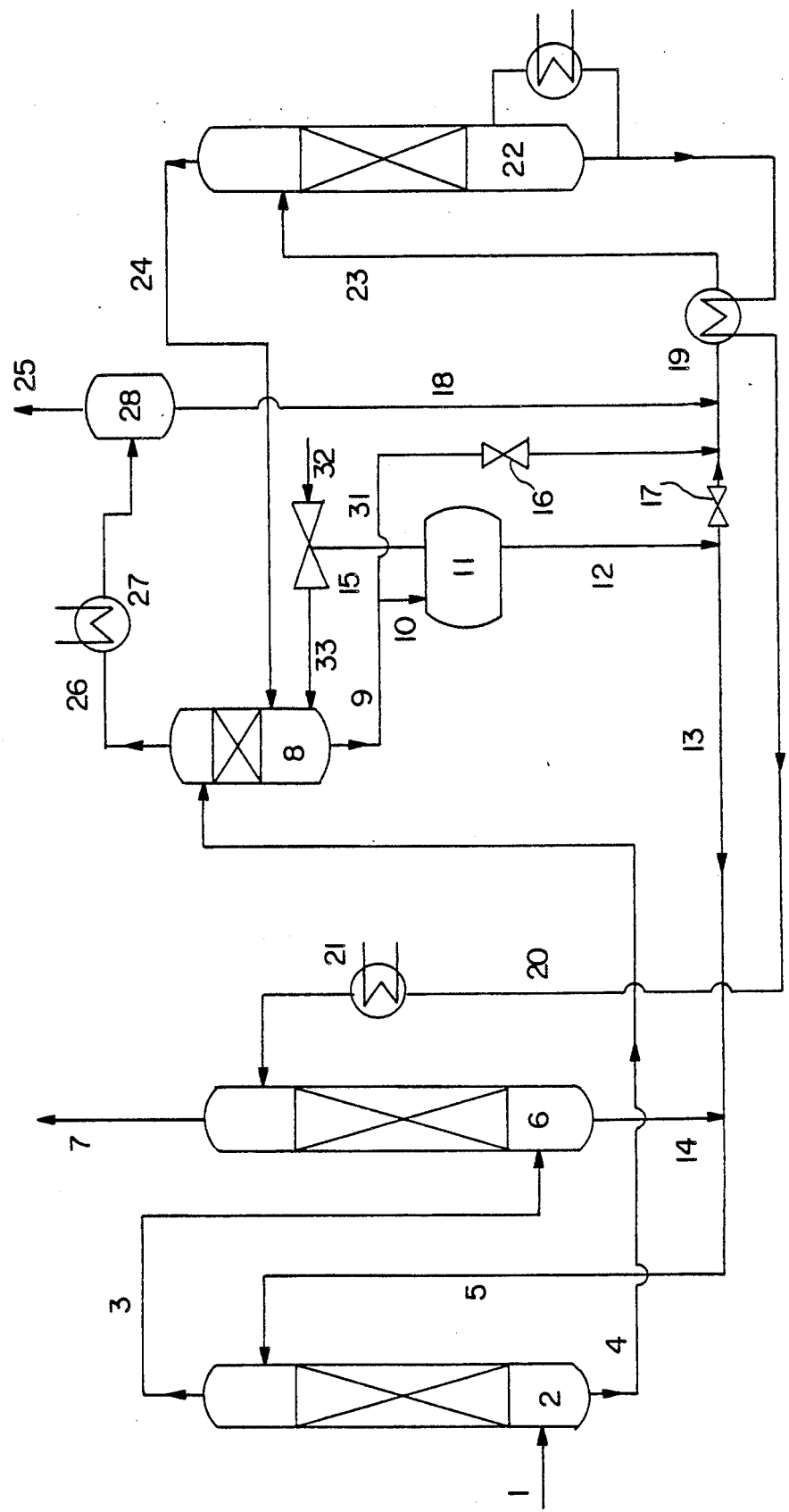
FIG. 2 schematically shows the process of the invention using a steam injector.

The two examples which follow illustrate the invention in more detail, the course of the process being shown diagrammatically in FIGS. 1 and 2.

In FIG. 1, a gas containing $CO_2$ and/or $H_2S$, e.g. a synthesis gas containing $CO_2$ as an acidic gas, is passed under superatmospheric pressure, via line 1, into the bottom of the first absorption column 2. At the same time, an absorption liquid comprising from 20 to 70% strength by weight aqueous methyldiethanolamine solution is introduced, via line 5, at the top of the first absorption column. The prewashed gas obtained at the top of the first absorption column is introduced via line 3 into the bottom of the second absorption column, for final purification. An absorption liquid comprising from 20 to 70% strength by weight aqueous methyldiethanolamine solution, which is obtained from the stripping column 22 and is virtually free of acidic gases, is simultaneously introduced at the top of the second absorption column, via line 20. The washed gas is taken off from the top of the second absorption column 6, via line 7. The aqueous absorption liquid which is obtained at the bottom of the second absorption column and is preladen with acidic gases is combined with the absorption liquid obtained via lines 12 and 13 from the final flash stage 11, and the combined liquids are then fed via lines 14 and 5 to the top of the first absorption column 2. The aqueous absorption liquid which is obtained at the bottom of the first absorption column 2 and is laden with $CO_2$ and/or $H_2S$ is regenerated by being let down via line 4 into a first flash chamber 8, for example via a valve or, preferably, an expansion turbine. In this stage, an intermediate flash gas is liberated from the absorption liquid and is taken off via line 26 and combined with the gas removed from the final flash stage 11 via line 30. After they have passed the heat exchanger 27 and the separation vessel 28, the combined gas streams are taken off via line 25. Liquid which separates out in separation vessel 28 is removed via line 18. If necessary, steam, e.g. low pressure steam under 2.5 bar, is passed via line 29 into the bottom of flash chamber 8, in order to compensate for the water losses in the system. At the bottom of the flash chamber 8, the absorption liquid which has been partially let down is taken off via line 9 and, in a first version of the process, with valve 16 closed and valve 17 open, is let down completely via line 10 into a second flash chamber 11 in which reduced pressure down to, for example, 0.5 bar is maintained, for example by means of vacuum pump 15. This liberates a flash gas which is rich in acidic gas, this flash gas being removed at the top of the flash chamber 11 via line 30 and being combined with the gas taken off from the first flash chamber 8 via line 26. Some of the absorption liquid which has been let down, and removed at the bottom of the flash chamber 11 via line 12, is recycled via lines 13 and 5 to the top of the absorption column 2, while the other part is introduced at the top of the stripping column 22 via line 23.

In a second version of the process, with valve 17 closed and valve 16 open, some of the absorption liquid which has been partially let down, and removed via line 9, is let down via line 10 into the second flash chamber 11, and the other part is introduced, via lines 31 and 23, at the top of the stripping column 22. In the second version, the absorption liquid which has been let down, and removed at the bottom of the flash chamber 11 via line 12, is recycled completely via lines 13 and 5 to the top of the absorption column 2.

The regenerated absorption liquid obtained at the bottom of the stripping column 22 is recycled, downstream of the heat exchangers 19 and 21, to the top of the second absorption column 6, via line 20. The exit gas stream which contains $CO_2$ and/or $H_2S$ and is obtained at the top of the stripping column 22 is fed via line 24, advantageously to the lower part of the flash chamber 8. However, it is also possible for the said exit gas stream to be removed directly from the system, without being fed beforehand to the flash chamber 8.

In another embodiment (cf. FIG. 2), the procedure described for the first embodiment is followed, except that, instead of a vacuum pump, the steam ejector 15 is used for generating the reduced pressure in the second flash chamber 11, the said ejector being supplied with steam via line 32, for example in the amout required to compensate for the water losses of the system. The gas taken off at the top of the flash chamber 11 is fed, together with the steam used for operating the steam ejector 15, to the bottom of the first flash chamber 8 via line 33.

The Example which follows illustrates the invention.

EXAMPLE

The gas washer used is shown in FIG. 2 and comprises two absorption columns connected in series, two flash chambers connected in series, and a stripping column. In the absorption columns, 9800 kmol/h of a $CO_2$-containing synthesis gas are washed with a 50% strength by weight aqueous methyldiethanolamine solution as the absorption liquid. The synthesis gas to be treated is fed under 28 bar to the bottom of the first absorption column. The gas to be treated originates from a steam reformer and has the following composition:

| | |
|---|---|
| $CO_2$ | 18.3 vol. % |
| CO | 0.4 vol. % |
| $H_2$ | 61.0 vol. % |
| $N_2$ | 20.0 vol. % |
| $CH_4$ | 0.1 vol. % |

-continued

| | |
|---|---|
| Ar | 0.2 vol. % |

The temperature of the absorption liquid in the feed to the first absorption column is 60° C., while that of the absorption liquid fed to the second absorption column is 75° C. The treated synthesis gas taken off at the top of the second absorption column has the following composition:

| | |
|---|---|
| $CO_2$ | 0.01 vol. % |
| CO | 0.5 vol. % |
| $H_2$ | 74.6 vol. % |
| $N_2$ | 24.5 vol. % |
| $CH_4$ | 0.2 vol. % |
| Ar | 0.3 vol. % |

The laden absorption liquid leaving the bottom of the first absorption column is let down to 5 bar in the first flash chamber. 1150 kmol/h of a flash gas are removed from the top of the first flash chamber. The absorption liquid taken off at the bottom of the second flash chamber is then let down into the second flash chamber, in which a pressure of 0.7 bar is maintained by means of a steam ejector. About ¾ of the let-down absorption liquid obtained at the bottom of the second flash chamber is recycled to the first absorption column, and the remaining part is regenerated in the stripping column and then recycled to the second absorption column.

Using the novel process, it is possible to use absorption columns with substantially smaller diameters and fewer trays, so that the capital costs for the gas washer can be substantially reduced.

We claim:

1. A process for removing $CO_2$ and/or $H_2S$ from a gas containing $CO_2$ and/or $H_2S$ by means of an aqueous alkanolamine-containing absorption liquid, which comprises
   (a) treating the gas containing $CO_2$ and/or $H_2S$, in a first absorption stage, at from 40° to 100° C., with an aqueous absorption liquid containing from 20 to 70% by weight of methyldiethanolamine,
   (b) feeding the gas obtained at the top of the first absorption stage to a second absorption stage in which, to effect further removal of $CO_2$ and/or $H_2S$, it is treated at from 30° to 90° C. with an aqueous absorption liquid which contains from 20 to 70% by weight of methyldiethanolamine and has a lower content of $CO_2$ and/or $H_2S$ than the absorption liquid fed into the first absorption stage,
   (c) taking off the treated gas at the top of the second absorption stage,
   (d) feeding the aqueous absorption liquid obtained at the bottom of the second absorption stage and preladen with $CO_2$ and/or $H_2S$ to the top of the first absorption stage,
   (e) letting down the aqueous absorption liquid obtained in the lower part of the first absorption stage and laden with $CO_2$ and/or $H_2S$ in two or more flash stages in order to regenerate it, the final flash stage being operated under a reduced pressure of from about 0.3 to 1 bar,
   (f) recycling a stream of absorption liquid obtained at the bottom of the final flash stage to the first absorption stage,
   (g) feeding a further stream of absorption liquid obtained at the bottom of the final and/or penultimate flash stages to a stripping zone for further regeneration, and
   (h) recycling the regenerated absorption liquid obtained at the bottom of the stripping zone to the second absorption stage.

2. The process of claim 1, wherein, in order to compensate for the water losses as a result of water being present in the gas streams taken off at the top of the second absorption stage and/or from the flash stages and/or from the stripping zone, an amount of steam corresponding to the water loss is fed to the bottom of the penultimate flash stage.

3. The process of claim 1, wherein the reduced pressure in the final flash stage is produced by means of a steam ejector.

4. The process of claim 3, wherein the gas taken off at the top of the final flash stage is fed, together with the steam used for operating the steam ejector, to the bottom of the penultimate flash stage.

5. The process of claim 1, wherein the final flash stage of step (e) is operated at from 0.6 to 0.9 bar.

* * * * *

UNITED STATES PATENT AND TRADEMARK OFFICE
CERTIFICATE OF CORRECTION

PATENT NO. : 4,997,630

DATED : March 5, 1991

INVENTOR(S) : Eckhart WAGNER et al.

It is certified that error appears in the above-identified patent and that said Letters Patent is hereby corrected as shown below:

IN THE ABSTRACT

Lines 3 and 8: "79%" should read --70%--

Signed and Sealed this

Fourth Day of August, 1992

Attest:

DOUGLAS B. COMER

*Attesting Officer*     *Acting Commissioner of Patents and Trademarks*